US011032526B2

(12) United States Patent
Tsao et al.

(10) Patent No.: US 11,032,526 B2
(45) Date of Patent: Jun. 8, 2021

(54) PROJECTION DEVICE, PROJECTION METHOD AND PROJECTION SYSTEM

(71) Applicant: Coretronic Corporation, Hsin-Chu (TW)

(72) Inventors: Hao-Chang Tsao, Hsin-Chu (TW); Wen-Chang Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/877,494

(22) Filed: May 19, 2020

(65) Prior Publication Data

US 2020/0374496 A1 Nov. 26, 2020

Related U.S. Application Data

(60) Provisional application No. 62/851,650, filed on May 23, 2019.

(30) Foreign Application Priority Data

Aug. 14, 2019 (CN) .......................... 201910748491.0
Mar. 3, 2020 (CN) .......................... 202010138243.7

(51) Int. Cl.
*H04N 9/31* (2006.01)
*H04N 19/42* (2014.01)
*G06F 3/16* (2006.01)

(52) U.S. Cl.
CPC ........... *H04N 9/3141* (2013.01); *G06F 3/165* (2013.01); *H04N 19/42* (2014.11)

(58) Field of Classification Search
CPC .... H04N 9/3141; H04N 9/312; H04N 9/3194; H04N 19/42; H04N 5/63; H04N 9/31; G06F 3/165; G09G 3/3688; G09G 3/3696

(Continued)

(56) References Cited

U.S. PATENT DOCUMENTS

| 2007/0249396 | A1 | 10/2007 | Nitta et al. | |
| 2010/0099458 | A1* | 4/2010 | Shin | H04M 1/0241 348/744 |
| 2010/0197354 | A1* | 8/2010 | Lee | H04M 1/0272 348/744 |

FOREIGN PATENT DOCUMENTS

| CN | 201049607 | 4/2008 |
| CN | 106292140 | 1/2017 |

(Continued)

OTHER PUBLICATIONS

"Search Report of Europe Counterpart Application", dated Oct. 16, 2020, p. 1-p. 11.

*Primary Examiner* — Sherrie Hsia
(74) *Attorney, Agent, or Firm* — JCIPRNET

(57) ABSTRACT

The invention provides projection device, a projection method and a projection system. The projection system includes the projection device. The projection method is for controlling the projection device. The projection device includes a projection apparatus, a video and audio processing circuit and a power control circuit. The video and audio processing circuit is coupled to the projection apparatus. The power control circuit is coupled to the projection apparatus and the video and audio processing circuit. The power control circuit is for receiving a power signal correspondingly provided by an external power supply unit when a switchable mechanism is in an open state. The power control circuit enables the projection apparatus and the video and audio processing circuit according to the power signal, such that the video and audio processing circuit outputs image data to the projection apparatus and controls the projection apparatus to project a dynamic projection image.

20 Claims, 5 Drawing Sheets

(58) Field of Classification Search
USPC ................ 348/744, 739, 730; 345/204, 211; 455/566, 556.1, 571–574
See application file for complete search history.

(56) References Cited

FOREIGN PATENT DOCUMENTS

| | | |
|---|---|---|
| KR | 20110133387 | 12/2011 |
| TW | M410844 | 9/2011 |
| WO | 2018035484 | 2/2018 |

\* cited by examiner

PROJECTION DEVICE, PROJECTION METHOD AND PROJECTION SYSTEM

CROSS-REFERENCE TO RELATED APPLICATION

This application claims the priority benefit of U.S. Provisional application Ser. No. 62/851,650, filed on May 23, 2019, China application serial no. 201910748491.0, filed on Aug. 14, 2019, and China application serial no. 202010138243.7, filed on Mar. 3, 2020. The entirety of the above-mentioned patent application is hereby incorporated by reference herein and made a part of this specification.

BACKGROUND OF THE INVENTION

Technical Field

The invention relates to a projection technology field, in particular, to a projection device, a projection method and a projection system.

Description of Related Art

Generally, an illumination indicating apparatus of an automobile is arranged at the lower edge of a door, so that the illumination indicating apparatus can provide a bright illumination effect when a driver or passenger goes into or out of the automobile in darkness or at night. However, a conventional illumination indicating apparatus of an automobile only projects an illumination light beam with a fixed pattern to the ground and thus cannot provide diversified projection effects. Additionally, after the door is opened, the conventional illumination indicating apparatus of the automobile continuously projects the illumination light beam to the ground, so that an automobile battery will constantly consume electric power until the electric power is exhausted. Therefore, a solution of this invention is provided as follows to provide the diversified projection effects or effectively avoid the electric power exhaustion of the automobile battery by the illumination indicating apparatus of the automobile.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

A projection device, a projection method and a projection system provided by the invention can automatically project a dynamic projection image according to the open/closed state of a switchable mechanism. Besides, the projection system may provide multiple projection performances and effectively avoid wasting the power of the automobile battery.

In order to achieve one of, part of or all of the above-mentioned objectives or other objectives, the projection device is arranged on the switchable mechanism. The projection device includes a projection apparatus, a video and audio processing circuit and a power control circuit. The video and audio processing circuit is coupled to the projection apparatus. The power control circuit is coupled to the projection apparatus and the video and audio processing circuit. The power supply circuit is used for receiving a power signal correspondingly provided by an external power supply unit when the switchable mechanism is in an open state. The power control circuit enables the projection apparatus and the video and video processing circuit to operate according to the power signal, such that the video and audio processing circuit outputs dynamic image data to the projection apparatus, and the projection apparatus is controlled to project a dynamic projection image according to the dynamic image data.

In order to achieve one of, part of or all of the above-mentioned objectives or other objectives, the projection method provided by the invention is applied to the projection device. The projection method includes the following steps. The projection apparatus and the video and audio processing circuit are enabled by the power control circuit according to the power signal when the power control circuit receives the power signal correspondingly provided by the external power supply unit in the open state of the switchable mechanism. The dynamic image data is outputted to the projection apparatus by the video and audio processing circuit. The projection apparatus is controlled to project the dynamic projection image according to the dynamic image data.

In order to achieve one of, part of or all of the above-mentioned objectives or other objectives, the projection system provided by the invention includes the switchable mechanism and a sensor. The sensor is used for judging whether the switchable mechanism is in the open state so as to output a sensing signal. A power supply unit is coupled to the sensor. The power supply unit is used for providing the power signal according to the sensing signal. The projection device includes the projection apparatus, the video and audio processing circuit and the power control circuit. The audio and video processing circuit is coupled to the projection apparatus. The power control circuit is coupled to the projection apparatus and the video and audio processing circuit. The power control circuit is used for receiving the power signal. The power supply circuit enables the projection apparatus and the video and audio processing circuit to operate according to the power signal, such that the video and audio processing circuit outputs the dynamic image data to the projection apparatus, and the projection apparatus is controlled to project the dynamic projection image according to the dynamic image data.

In order to achieve one of, part of or all of the above-mentioned objectives or other objectives, the projection device is arranged on the switchable mechanism. The projection device includes a projection apparatus, a video and audio processing circuit, a power control circuit and a data connection module. The video and audio processing circuit is coupled to the projection apparatus. The power control circuit is coupled to the projection apparatus and the video and audio processing circuit. The power supply circuit is used for receiving a power signal correspondingly provided by an external power supply unit when the switchable mechanism is in an open state. The power control circuit enables the projection apparatus and the video and video processing circuit to operate according to the power signal, such that the video and audio processing circuit outputs dynamic image data to the projection apparatus, and the projection apparatus is controlled to project a dynamic projection image according to the dynamic image data. The data connection module is coupled to the video and audio processing circuit, the data connection module is adapted to connect to an outside data source in wire or wireless manner so as to receive at least one of updated dynamic image data, updated static image data or updated audio data.

Based on the above, the projection device, the projection method and the projection system can automatically sense the open/close state of the switchable mechanism through the sensor. When the switchable mechanism is in the open state, the projection device automatically and instantly projects the dynamic projection image to the ground, so as to instantly show the projection effect preset by a user on a projection surface.

Other objectives, features and advantages of the invention will be further understood from the further technological features disclosed by the embodiments of the invention wherein there are shown and described preferred embodiments of this invention, simply by way of illustration of modes best suited to carry out the invention.

In order to make the aforementioned and other objectives and advantages of the invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
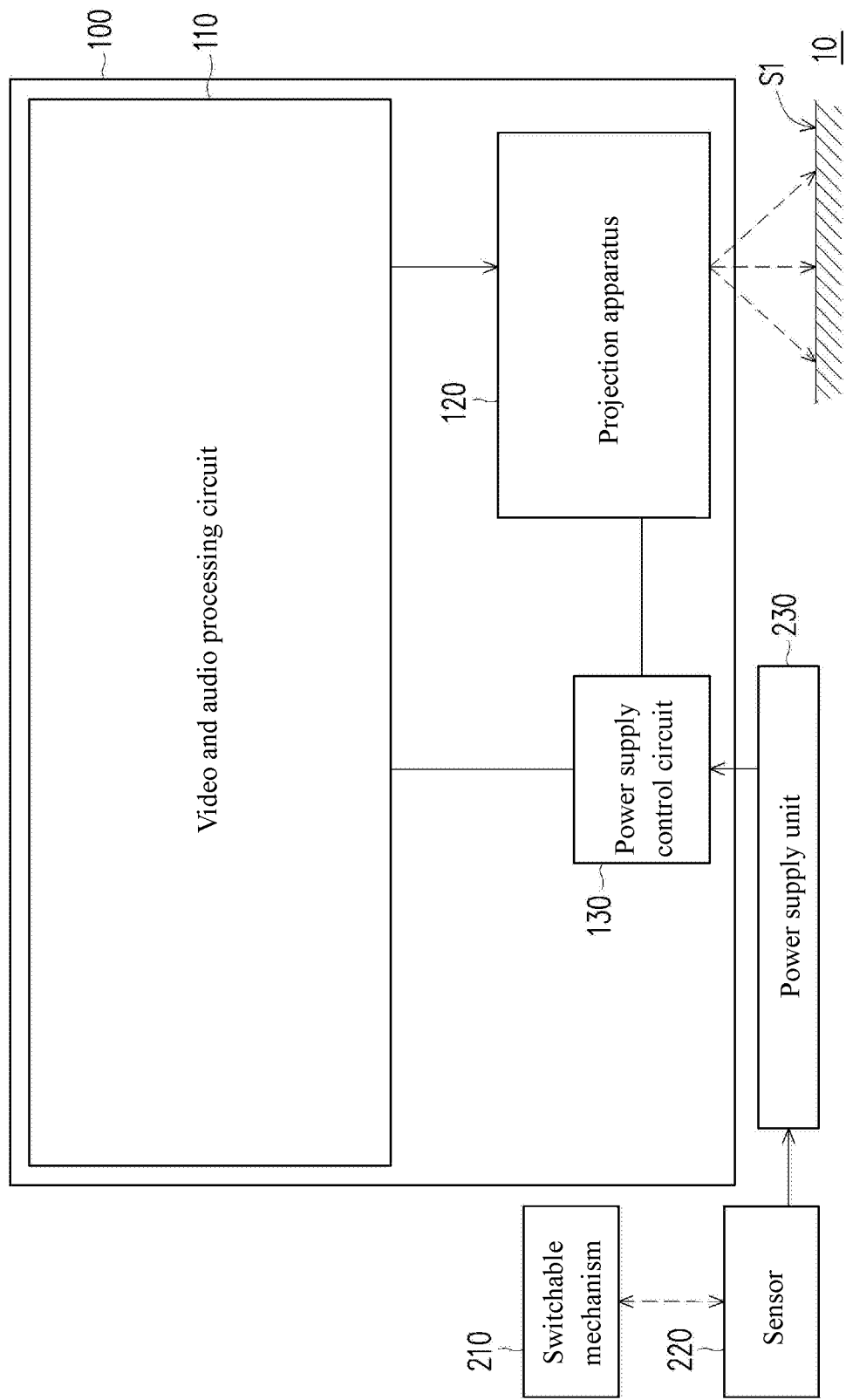
FIG. 1 is a configuration block diagram of a projection system according to an embodiment of the invention.

FIG. 1 is a configuration block diagram of a projection system according to an embodiment of the invention. Referring to FIG. 1, the projection system 10 includes a projection device 100, a switchable mechanism 210, a sensor 220 and a power supply unit 230. The power supply unit 230 is coupled to the projection device 100. The sensor 220 is coupled to the power supply unit 230. In the embodiment, the sensor 220 may be arranged on the switchable mechanism 210 and is used for judging whether the switchable mechanism 210 is in an open state. When the sensor 220 senses that the switchable mechanism 210 is in the open state, the sensor 220 outputs a sensing signal to the power supply unit 230, such that the power supply unit 230 provides a power signal to the projection device 100 according to the sensing signal. The power signal means electrical power, an electrical current or voltage. That is, the power supply unit 230 provides electric power (voltage) to a power control circuit 130. In the embodiment, after the projection device 100 is started through the power supply unit 230, the projection device 100 reads dynamic image data stored in the projection device 100 to project a dynamic projection image to a projection surface S1 (a projection target), and the projection surface S1, for example, is the ground. Coupling may be defined as the transmission of electric signal or data. In the embodiment, the projection device 100 includes a video and audio processing circuit 110, a projection apparatus 120 and a power control circuit 130. The power control circuit 130 is coupled to the video and audio processing circuit 110 and the projection apparatus 120, and is externally coupled to the power supply unit 230. In an embodiment, the switchable mechanism 210 may be an automobile door plate and the projection device 100 may be arranged at the lower edge of the automobile door plate. In other embodiments, the switchable mechanism 210 is arranged outside the projection device 100. The power supply unit 230, for example, is a battery arranged on an automobile. The sensor 220, for example, senses whether the automobile door plate is open, for example, by optical sensing, mechanical sensing or electromagnetic sensing. For example, the sensor 220 may be a microswitch. The microswitch detects the open state of the switchable mechanism 210 in a mechanical mode, but it is not limited thereto. In other embodiments, the sensor 220 may be an infrared sensor, a switching sensor, a somatosensory sensor or the like. In other words, when the automobile door plate is in an open state, the projection device 100 projects a dynamic projection image to the ground so as to provide a special projection effect. The special projection effect, for example, is used for reminding or showing a specific situation, and it is not limited thereto. However, the switchable mechanism is not limited to the automobile door plate. In other embodiments, the switchable mechanism 210 may be a window, a door or other objects capable of being switched to an open state or a close state.

Figure 2:
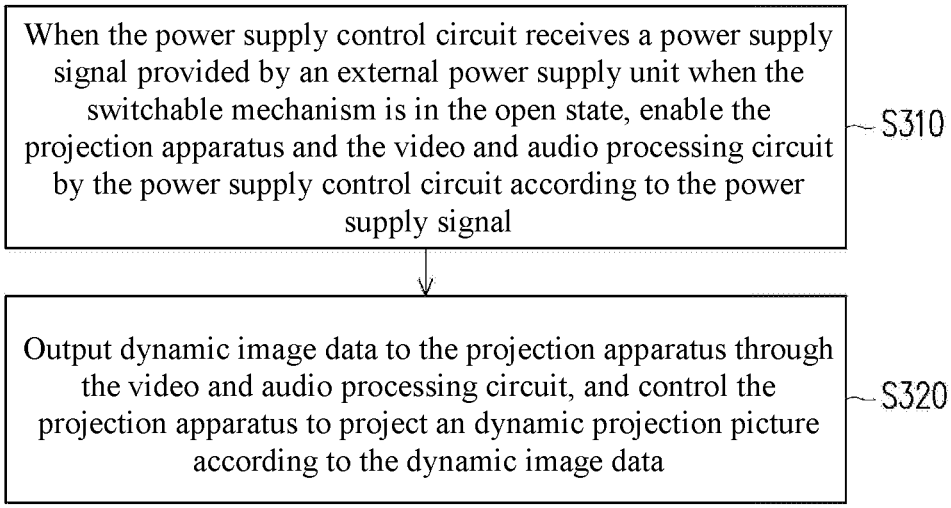
FIG. 2 is a flow diagram of a projection method according to an embodiment of the invention.

FIG. 2 is a flow diagram of a projection method according to an embodiment of the invention. Referring to FIG. 1 and FIG. 2, the projection method according to the embodiment is applicable to the projection system 10 and the projection device 100 in FIG. 1. The projection device 100 executes Steps S310 to S320. In Step S310, when the power control circuit 130 receives a power signal correspondingly provided by the power supply unit 230 outside the projection device 100 when the switchable mechanism 210 is in an open state, the power control circuit 130 enables the projection apparatus 120 and the video and audio processing circuit 110 to operate according to the power signal. In Step S320, the video and audio processing circuit 110 outputs dynamic image data to the projection apparatus 120, and the projection apparatus 120 is controlled to project a dynamic projection image according to the dynamic image data. Therefore, the projection method and the projection device in the embodiment can automatically and instantly project the dynamic projection image to the projection surface S1 according to the open state of the switchable mechanism 210. Additionally, those skilled in the art can clearly understand hardware architectures of the video and audio processing circuit 110, the projection apparatus 120 and the power control circuit 130. For example, the video and audio processing circuit 110 is a circuit or a chip capable of processing image data and a circuit or a chip capable of processing audio data. The projection apparatus 120 has a light source, a lens and an optical projection apparatus of a display image generating module, and the details are disclosed in the following of the specification. Additionally, the power control circuit 130 is a circuit used for voltage conversion, is mainly a step-down circuit, for example, a buck converter which is also called a buck chopper, but it is not limited thereto. For example, the power control circuit 130 has the function of lowering the voltage value of a battery arranged on the automobile from 12V to 3V to 5V to conform to the voltage value required by the projection device 100.

Figure 3:
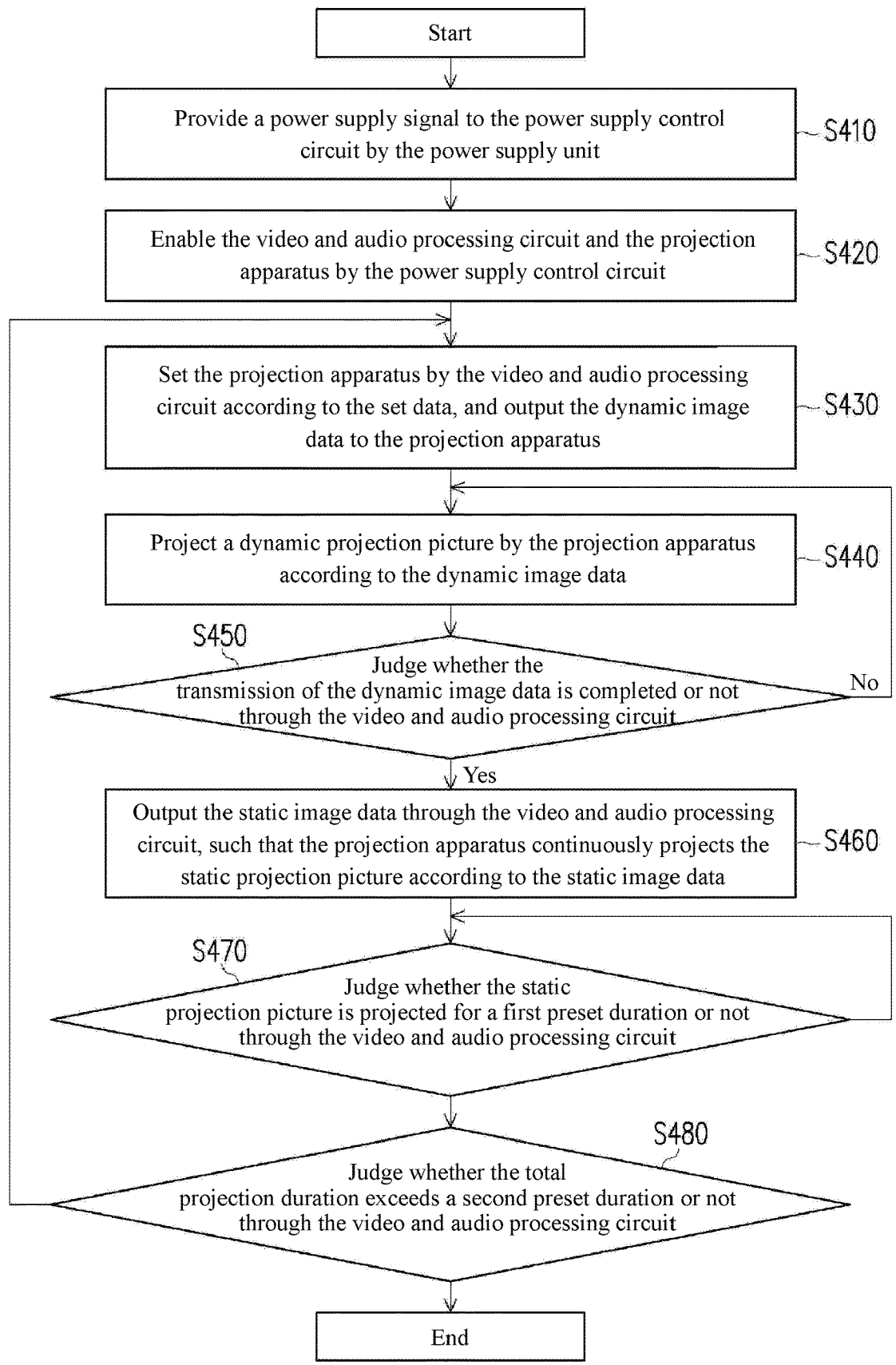
FIG. 3 is a flow diagram of a projection method according to another embodiment of the invention.

FIG. 3 is a flow diagram of a projection method according to another embodiment of the invention. Referring to FIG. 1 and FIG. 3, in the embodiment, the projection device 100 automatically switches the projection of a dynamic projection image or the projection of a static projection image. When a sensor 220 judges that a switchable mechanism 210 is open, a projection system 10 and the projection device 100 execute Steps S410 to S480 so as to determine whether to project the dynamic projection image or to project the static projection image according to the projection duration. In Step S410, a power supply unit 230 provides a power signal to a power control circuit 130. In Step S420, the power control circuit 130 enables a video and audio processing circuit 110 and a projection apparatus 120 to operate. In Step S430, the video and audio processing circuit 110 sets the projection apparatus 120 according to set data and outputs dynamic image data to the projection apparatus 120. The set data refers to projection parameters (brightness, contrast ratio, etc.), the projection image setting (aspect ratio, resolution, etc.) or the control setting (projection duration, etc.) of the projection apparatus 120 set in advance by a user. In Step S440, the projection apparatus 120 projects the dynamic projection image according to the dynamic image data. In Step S450, the video and audio processing circuit 110 judges whether the transmission of the dynamic image data is completed. If not, the projection device 100 executes Step S440 again, such that the video and audio processing circuit 110 continuously outputs the dynamic image data until the video and audio processing circuit 110 judges that the transmission of the dynamic image data is completed (or the playing is completed). Then, in Step S460, the video and audio processing circuit 110 outputs the static image data, such that the projection apparatus 120 continuously projects the static projection image according to the static image data. In Step S470, the video and audio processing circuit 110 judges whether the static projection image has reached a first preset duration. If not, the projection device 100 executes Step S470 again so as to continuously monitor whether the static projection image has reached the first duration. If so, the projection device 100 executes Step S480. In Step S480, the video and audio processing circuit 110 judges whether the total projection duration exceeds a second preset duration. If not, the projection device 100 executes Steps S430 to S480 again when the total projection duration does not exceed the second preset duration. If so, the projection device 100 completes the projection.

In other words, by using the projection method in the embodiment, the projection device 100 may first project the dynamic projection image until the playing of the dynamic image data is completed when the switchable mechanism 210 is in an open state. Then, the projection device 100 continuously projects the static projection image until the static projection image is projected for the first preset duration. If the switchable mechanism 210 is still in the open state, the projection device 100 projects the dynamic projection image again. However, if the switchable mechanism 210 is still in the open state, but the time for the projection device 100 to repeatedly project the dynamic projection image and the static projection image has exceeded the second preset duration, the projection device 100 stops the projection so as to avoid electric power waste. Additionally, by using the projection method in the embodiment, if the switchable mechanism 210 becomes a close state at any time, the projection device 100 stops executing Steps S410 to S480, and until the next time that the switchable mechanism 210 becomes the open state, the projection device 100 executes Steps S410 to S480 again.

Figure 4:
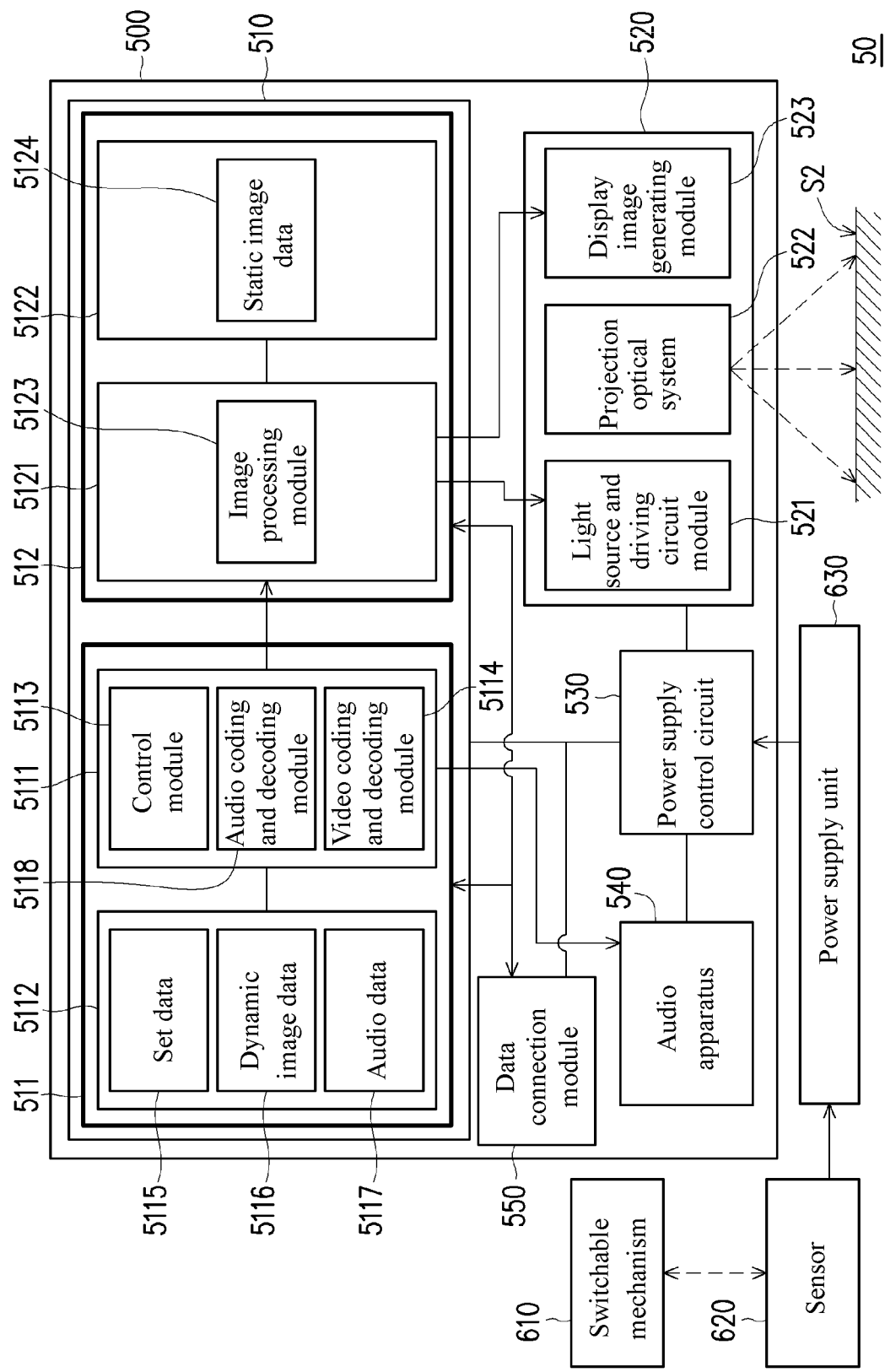
FIG. 4 is a configuration block diagram of a projection system according to another embodiment of the invention.

FIG. 4 is a configuration block diagram of a projection system according to another embodiment of the invention. Referring to FIG. 4, in the embodiment, a projection system 50 includes a projection device 500, a switchable mechanism 610, a sensor 620 and a power supply unit 630. The power supply unit 630 is coupled to the projection device 500. The sensor 620 is coupled to the power supply unit 630. The projection device 500 includes a video and audio processing circuit 510, a projection apparatus 520, a power control circuit 530 and an audio apparatus 540. In other words, compared with that in FIG. 1, the projection device 500 in the embodiment may further provide an audio outputting function. In the embodiment, the audio and video processing circuit 510 includes a first control circuit 511 and a second control circuit 512. The first control circuit 511 is a main control circuit and is used for controlling the second control circuit 512 and audio apparatus 540. The second control circuit 512 belongs to a video control circuit, and is used for controlling the projection apparatus 520.

In the embodiment, the first control circuit 511 includes a first processing circuit 5111 and a first memory 5112. The first processing circuit 5111 includes a control module 5113, a video coding and decoding module 5114 and an audio coding and decoding module 5118. The first memory 5112 is used for storing set data 5115, (compressed) dynamic image data 5116 and audio data 5117. The second control circuit 512 includes a second processing circuit 5121 and a second memory 5122. The second processing circuit 5121 includes an image processing module 5123. The second memory 5122 is used for storing static image data 5124. In the embodiment, the projection apparatus 520 includes a light source and driving circuit module 521, a projection optical system 522 and a display image generating module 523. The second processing circuit 5121 is coupled to the light source and driving circuit module 521 and the display image generating module 523. Additionally, the light source and driving circuit module 521 provides an illumination light beam. The illumination light beam is transmitted to the display image generating module 523. The display image generating module 523 converts the illumination light beam into an image light beam which is projected to a projection surface S2 (or a projection target) by the projection optical system 522. The projection optical system 522 is positioned on a transmission path of the image light beam. The projection optical system 522, for example, consists of a plurality of lens and is used for transmitting the image light beam.

Specifically, when the video and audio processing circuit 510 is enabled by the power control circuit 530 to project, the video coding and decoding module 5114 of the first processing circuit 5111 is used for decompressing the compressed dynamic image data 5116 so as to provide the decompressed data to the second processing circuit 5121.

The control module 5113 of the first processing circuit 5111 sets the second processing circuit 5121 according to the set data 5115 or provides the set data 5115 to the second processing circuit 5121, such that the second processing circuit 5121 sets the projection apparatus 520 according to the set data 5115. Additionally, the first processing circuit 5111 also outputs the audio data 5117 to the audio apparatus 540. The image processing module 5123 of the second processing circuit 5121 converts the dynamic image data into data readable by the projection apparatus 520 and outputs to the display image generating module 523 of the projection apparatus 520. The audio apparatus 540 outputs audio according to the audio data 5117. The audio apparatus 540, for example, is a speaker. In the embodiment, the second processing circuit 5121 outputs a driving signal to a driving circuit in the light source and driving circuit module 521, so as to operate a driving circuit 521 to drive a light source to project the illumination light beam. The display image generating module 523 provides the image light beam corresponding to the projection data according to received data and transmits the image light beam to the projection optical system 522, such that the projection optical system 522 projects a dynamic projection image corresponding to the image light beam to the projection surface S2 (or the projection target). Additionally, the image processing module 5123 of the second processing circuit 5121 in the embodiment may also read the static image data 5124 of the second memory 5122 so as to provide the static image data 5124 to the display image generating module 523. The display image generating module 523 provides the image light beam corresponding to the projection data according to the received static image data 5124 and transmits the image light beam to the projection optical system 522, such that the projection optical system 522 projects the static projection image corresponding to the image light beam to the projection surface S2. It is worth noting that the playing durations of the audio data 5117 and the dynamic image data 5116 in the embodiment are synchronous, or the playing duration of the audio data 5117 covers the total playing duration of the dynamic image data 5116 and the static image data 5124, and it is not limited thereto.

Referring to FIG. 4, a projection device 500 further includes a data connection module 550. The data connection module 550 is coupled to a first control circuit 511 and a second control circuit 512. The data connection module 550 is also coupled to an outside data source (not shown) so as to receive at least one of updated dynamic image data, updated static image data or updated audio data. It means that the outside data source may provide one of updated dynamic image data, updated static image data and updated audio data, or provide two of updated dynamic image and updated static image data, etc. or provide three. The data connection module 550 transmits the above updated data to the first control circuit 511 and the second control circuit 512. The first control circuit 511 receives the updated dynamic image or updated audio data to storage in the first memories 5112. The second control circuit 512 receives updated static image data to storage in the second memories 5122. The outside data source may be a computer or smart phone, etc. When a user wants to update at least one of dynamic image data, static image data or audio data the data of the projection device 500, the projection device 500 can be updated by the data connection module 550. The data connection module 550 is connected to the outside data source by wire or wireless. The data connection module 550 may be an Universal Serial Bus (USB), a Controller Area Network (CAN) or CAN bus, WiFi and Bluetooth, etc.

For example, the projection method in FIG. 3 is also applicable to the projection system 50 in FIG. 4. Referring to FIG. 3 and FIG. 4, when a sensor 620 judges that a switchable mechanism 610 is open, the projection system 50 and the projection device 500 execute Steps S410 to S480. In Step S410, a power supply unit 630 provides a power signal to the power control circuit 530. In Step S420, the power control circuit 530 enables the video and audio processing circuit 510 and the projection apparatus 520 to operate. In Step S430, the first processing circuit 5111 of the video and audio processing circuit 510 sets the second processing circuit 5121 according to the set data 5115 or provides the set data 5115 to the second processing circuit 5121, such that the second processing circuit 5121 sets the projection apparatus 520 according to the set data 5115 and outputs the dynamic image data 5116 to the projection apparatus 520. The set data refers to projection parameters, projection image setting or the control setting of the projection apparatus 520 set by the user in advance. Additionally, the first processing circuit 5111 also outputs the audio data 5117 to the audio apparatus 540. In Step S440, the projection apparatus 520 projects the dynamic projection image according to the dynamic image data 5116 and the audio apparatus 540 outputs an audio according to the audio data 5117.

In Step S450, the first processing circuit 5111 of the video and audio processing circuit 510 judges whether the transmission of the dynamic image data 5116 is completed. If not, the projection device 500 executes Step S440 again, such that the first processing circuit 5111 of the video and audio processing circuit 510 continuously outputs the dynamic image data 5116 until the first processing circuit 5111 of the video and audio processing circuit 510 judges that the transmission of the dynamic image data 5116 is completed. Then, in Step S460, the second processing circuit 5121 of the video and audio processing circuit 510 outputs the static image data, such that the projection apparatus 520 continuously projects the static projection image according to the static image data. In Step S470, the second processing circuit 5121 of the video and audio processing circuit 510 judges whether the static projection image has reached the first preset duration. If not, the projection device 500 executes Step S470 again so as to continuously monitor whether the static projection image has reached the first preset duration. If so, the projection device 500 executes Step S480. In Step S480, the second processing circuit 5121 of the video and audio processing circuit 510 judges whether the total projection duration has exceeded a second preset duration. If not, the projection device 500 executes Steps S430 to S480 again. If so, the projection device 500 completes the projection. Therefore, the projection system 50 and the projection device 500 in the embodiment can automatically project the dynamic projection image or the static projection image to the projection surface S2 according to the duration of the open state of the switchable mechanism 610.

Figure 5:
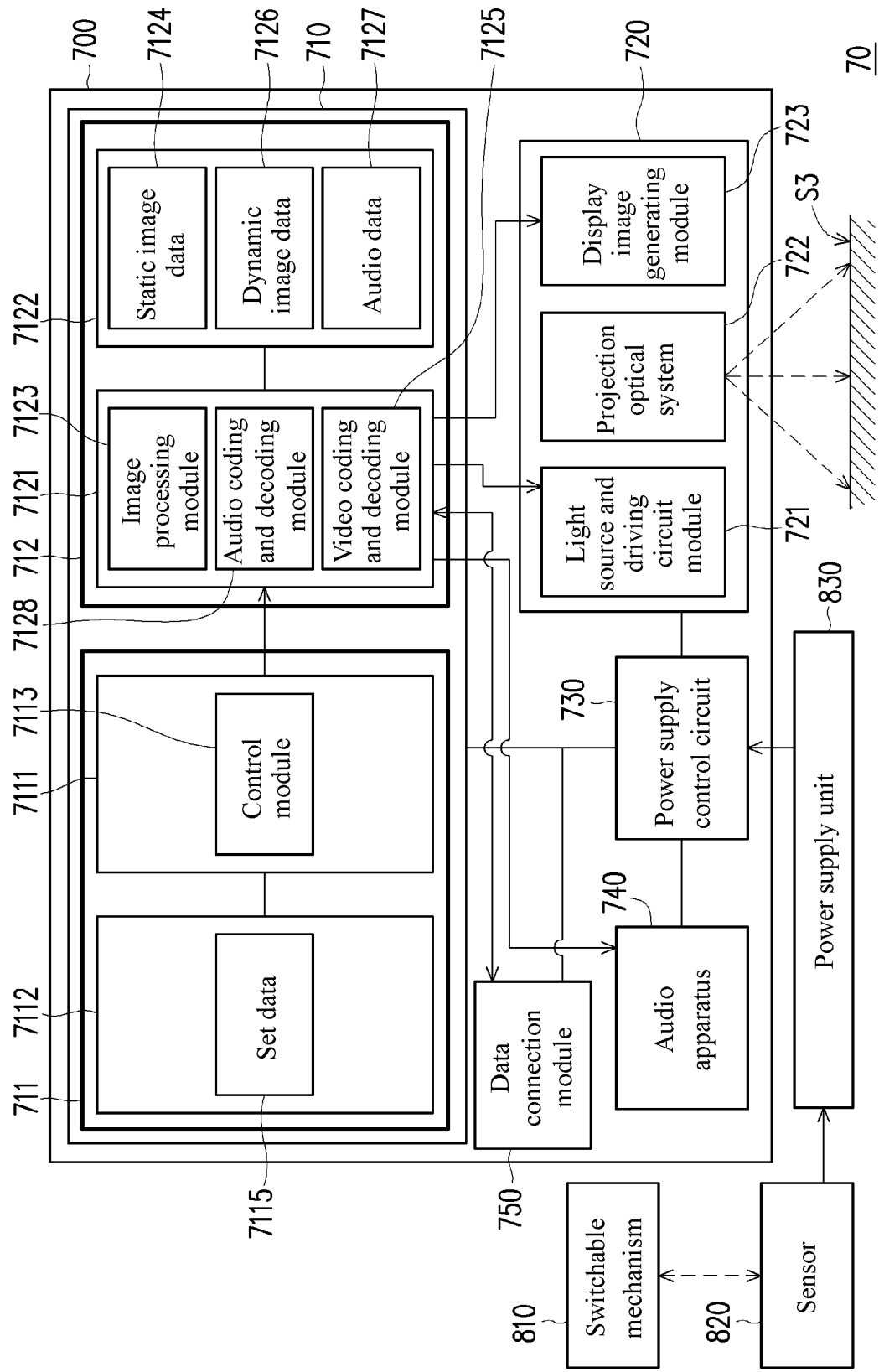
FIG. 5 is a configuration block diagram of a projection system according to still another embodiment of the invention.

FIG. 5 is a configuration block diagram of a projection system according to another embodiment of the invention. In the embodiment, a projection system 70 includes a projection device 700, a switchable mechanism 810, a sensor 820 and a power supply unit 830. The power supply unit 830 is coupled to the projection device 700. The sensor 820 is coupled to the power supply unit 830. The projection device 700 includes a video and audio processing circuit 710, a projection apparatus 720, a power control circuit 730 and an audio apparatus 740. In other words, compared with that in FIG. 1, the projection device 700 in the embodiment further provides an audio outputting function. In the embodiment, the video and audio processing circuit 710 includes a first control circuit 711 and a second control circuit 712. The first control circuit 711 is a main control circuit and is used for controlling the second control circuit 712. The second control circuit 712 is a video and audio control circuit and is used for controlling the projection apparatus 720 and the audio apparatus 740.

In the embodiment, the first control circuit 711 includes a first processing circuit 7111 and a first memory 7112. The first processing circuit 7111 includes a control module 7113. The first memory 7112 is used for storing set data 7115. The second control circuit 712 includes a second processing circuit 7121 and a second memory 7122. The second processing circuit 7121 includes an image processing module 7123, a video coding and decoding module 7125 and an audio coding and decoding module 7128. The second memory 7122 is used for storing static image data 7124, (compressed) dynamic image data 7126 and audio data 7127. In the embodiment, the projection apparatus 720 includes a light source and driving circuit module 721, a projection optical system 722 and a display image generating module 723. The second processing circuit 7121 is coupled to the light source and driving circuit module 721 and the display image generating module 723. Additionally, the light source and driving circuit module 721 provides an illumination light beam. The illumination light beam is transmitted to the display image generating module 723. The display image generating module 723 converts the illumination light beam into an image light beam which is projected to a projection surface S3 (or a projection target) through the projection optical system 722. The projection optical system 722 is positioned on a transmission path of the image light beam. The projection optical system 722, for example, consists of a plurality of lens and is used for transmitting the image light beam.

Specifically, when the video and audio processing circuit 710 is enabled through the power control circuit 730 for projection, the control module 7113 of the first processing circuit 7111 sets the second processing circuit 7121 according to the set data 7115 or provides the set data 7115 to the second processing circuit 7121. The video coding and decoding module 7125 of the second processing circuit 7121 decompresses the compressed dynamic image data 7126. The image processing module 7123 converts the decompressed dynamic image data 7126 into dynamic image data 7126 readable by the projection apparatus 720 and outputs to the display image generating module 723 of the projection apparatus 720. Additionally, the second processing circuit 7121 also provides the audio data 7127 to the audio apparatus 740. The audio apparatus 740 outputs audio according to the audio data 7127. In the embodiment, the second processing circuit 7121 outputs a driving signal to a driving circuit in the light source and driving circuit module 721, so as to operate the driving circuit to drive a light source to project the illumination light beam. The display image generating module 723 provides an image light beam corresponding to the projection data according to the received data and transmits the image light beam to the projection optical system 722, such that the projection optical system 722 projects a dynamic projection image corresponding to the image light beam to the projection surface S3 (or the projection target). Additionally, the image processing module 7123 of the second processing circuit 7121 in the embodiment may also read static image data 7124 of the second memory 7122 so as to provide the static image data 7124 to the display image generating module 723. The display image generating module 723 provides an image light beam corresponding to the projection data according to the received static image data 7124 and transmits the image light beam to the projection optical system 722, such that the projection optical system 722 projects a static projection image corresponding to the image light beam to the projection surface S3. It is worth noting that the playing durations of the audio data 7127 and the dynamic image data 7126 in the embodiment are synchronous or the playing duration of the audio data 7127 covers the total playing duration of the dynamic image data 7126 and the static image data 7124, and it is not limited thereto.

For example, the projection method in FIG. 3 is also applicable to the projection system 70 in FIG. 5. Referring to FIG. 3 and FIG. 5, when the sensor 820 judges that the switchable mechanism 810 is open, the projection system 70 and the projection device 700 execute Steps S410 to S480. In Step S410, the power supply unit 830 provides a power signal to the power control circuit 730. In Step S420, the power control circuit 730 enables the video and audio processing circuit 710 and the projection apparatus 720 to operate. In Step 430, the first processing circuit 7111 of the video and audio processing circuit 710 sets the second processing circuit 7121 according to the set data 7115 or outputs the set data 7115 to the second processing circuit 7121, such that the second processing circuit 7121 sets the projection apparatus 720 according to the set data 7115 and outputs the dynamic image data 7126 to the projection apparatus 720. The set data refers to projection parameters, projection image setting or control setting of the projection apparatus 720 set in advance by the user. Additionally, the second processing circuit 7121 also outputs the audio data 7127 to the audio apparatus 740. In Step S440, the projection apparatus 720 projects the dynamic projection image according to the dynamic image data 7126. The audio apparatus 740 outputs audio according to the audio data 7127.

In Step S450, the second processing circuit 7121 of the video and audio processing circuit 710 judges whether the transmission of the dynamic image data 7126 is completed. If not, the projection device 700 executes Step S440 again until the second processing circuit 712 of the video and audio processing circuit 710 judges that the transmission of the dynamic image data 7126 is completed. Then, in Step S460, the second processing circuit 7121 of the video and audio processing circuit 710 outputs static image data, such that the projection apparatus 720 continuously projects the static projection image according to the static image data. In Step S470, the second processing circuit 7121 of the video and audio processing circuit 710 judges whether the static projection image has reached the first preset duration. If not, the projection device 700 executes Step S470 again so as to continuously monitor whether the static projection image has reached the first preset duration. If so, the projection device 700 executes Step S480. In Step S480, the second processing circuit 7121 of the video and audio processing circuit 710 judges whether the total projection duration has exceeded the second preset duration. If not, the projection device 700 executes Steps S430 to S480 again. If so, the projection device 700 completes the projection. Therefore, the projection system 70 and the projection device 700 in the embodiment may automatically project the dynamic projection image or the static projection image to the projection surface S3 according to the duration of the open state of the switchable mechanism 810.

It is worth noting that in the embodiments above, the projection apparatuses 120, 520 and 720 are optical systems in projectors known by those skilled in the art. The light sources in the light source and driving circuit modules 521 and 721 are luminous apparatuses that have, for example, a discharging bulb, a light emitting diode or a laser light source. The driving circuits in the light source and driving circuit modules 521 and 721 are light source driving circuits or chips. The display image generating modules 523 and 723 are, for example, reflective or transmissive spatial light modulators including, for example, a digital micromirror device (DMD), a liquid crystal on silicon (LCOS) display panel or a liquid crystal display (LCD). Additionally, the first processing circuits 5111 and 7111 and the second processing circuits 5121 and 7121 each, for example, includes a central processing unit (CPU) with an image processing function, other programmable general purpose or special purpose microprocessor, image processing unit (IPU), graphics processing unit (GPU), digital signal processor (DSP), application specific integrated circuit (ASIC) and field-programmable gate array (FPGA), other similar operational circuits or a combination of the circuits. The control modules 5113 and 7123, for example, are control circuits or chips. The video coding and decoding modules 5114 and 7125, for example, are circuits or chips for coding and decoding images. The audio coding and decoding modules 5118 and 7128, for example, are circuits or chips for coding and decoding audios. The image processing modules 5123 and 7123, for example, are image processing circuits or chips. Additionally, in other embodiments, the control modules 5113 and 7123, the video coding and decoding modules 5114 and 7125, and the image processing module 5123 and 7123 may be software programs or firmware stored in the first memories 5112 and 7112, the second memories 5122 and 7122 or other storage units, and are respectively read and executed by the first processing circuits 5111 and 7111 and the second processing circuits 5121 and 7121.

Referring to FIG. 5 again, the projection device 700 further includes a data connection module 750. The data connection module 750 is coupled to a second control circuit 712 of an audio processing circuit 710. The data connection module 750 is coupled to an outside data source so as to receive at least one of updated dynamic image data, updated static image data or updated audio data. It means that the outside data source may provide one of updated dynamic image data, updated static image data and updated audio data, or provide two of updated dynamic image and updated static image data, etc. or provide three. The data connection module 750 transmits the above updated data to the second control circuit 712. The second control circuit 712 receives the updated dynamic image or updated audio data to storage in a second memory 7122. The outside data source may be a computer or smart phone, etc. When an user wants to update at least one of dynamic image data, static image data or audio data the data of the projection device 700, the projection device 700 can be updated by the data connection module 750. The data connection module 750 is connected to the outside data source by wire or wireless. The data connection module 550 may be an Universal Serial Bus (USB), a Controller Area Network (CAN) or CAN bus, WiFi and Bluetooth, etc.

Based on the above, the projection apparatus, the projection system and the projection method provided by the invention can automatically and correspondingly project the dynamic projection image to the projection surface according to the open state of the switchable mechanism so as to provide the instant projection effect. Additionally, in some applications, the projection apparatus, the projection system and the projection method provided by the invention can continuously project the static projection image after the projection completion of the dynamic projection image or synchronously output audio so as to provide a special sound and light effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection device, comprising a projection apparatus, a video and audio processing circuit and a power control circuit, wherein the video and audio processing circuit is coupled to the projection apparatus; and the power control circuit is coupled to the projection apparatus and the video and audio processing circuit, and is used for receiving a power signal correspondingly provided by an external power supply unit when a switchable mechanism is in an open state, wherein the power control circuit enables the projection apparatus and the video and audio processing circuit according to the power signal, such that the video and audio processing circuit outputs a dynamic image data to the projection apparatus and controls the projection apparatus to project a dynamic projection image according to the dynamic image data, wherein the video and audio processing circuit comprises a first control circuit and a second control circuit, wherein the first control circuit is used for storing a set data; and the second control circuit is coupled to the first control circuit and the projection apparatus, and is used for controlling the projection apparatus, wherein the first control circuit and the second control circuit are respectively configured that the first control circuit is used for providing the set data to the second control circuit, and the second control circuit sets the projection apparatus according to the set data and outputs the dynamic image data to the projection apparatus.

2. The projection device of claim 1, wherein when projection of the dynamic projection image by the projection apparatus is completed and the switchable mechanism is still maintained in the open state, the audio and video processing circuit outputs a static image data to the projection apparatus, such that the projection apparatus continuously projects a static projection image according to the static image data for a first preset duration.

3. The projection device of claim 2, wherein when projection of the static projection image by the projection apparatus is completed and the switchable mechanism is still maintained in the open state, the video and audio processing circuit judges whether a total projection duration exceeds a second preset duration, when the total projection duration does not exceed the second preset duration, the projection apparatus projects the dynamic projection image and the static projection image again in sequence according to the dynamic image data and the static image data.

4. The projection device of claim 1, further comprising:

an audio apparatus, coupled to the power control circuit and the video and audio processing circuit, wherein the power control circuit enables the audio apparatus to operate according to the power signal, such that the video and audio processing circuit outputs an audio data to the audio apparatus and controls the audio apparatus to output an audio according to the audio data.

5. The projection device of claim 1, wherein the first control circuit comprises a first memory and a first processing circuit, and the second control circuit comprises a second memory and a second processing circuit, wherein the first processing circuit is coupled to the first memory and the second processing circuit, and the second processing circuit is coupled to the second memory and the projection apparatus, wherein the first memory is used for storing the set data and the second memory is used for storing the static image data.

6. The projection device of claim 5, wherein the first memory also stores a compressed dynamic image data, wherein a video coding and decoding module of the first processing circuit decompresses the compressed dynamic image data and outputs to the second processing circuit, wherein an image processing module of the second processing circuit converts a decompressed dynamic image data into an image data readable by the projection apparatus and outputs to the projection apparatus.

7. The projection device of claim 5, wherein the second memory also stores a compressed dynamic image data, wherein a control module of the first processing circuit provides the set data to the second processing circuit and a video coding and decoding module of the second processing circuit decompresses the compressed dynamic image data, wherein an image processing module of the second processing circuit converts a decompressed dynamic image data into an image data readable by the projection apparatus and outputs to the projection apparatus.

8. The projection device of claim 1, wherein the projection apparatus comprises a light source and driving circuit module, a display image generating module and a projection optional system, wherein the light source and driving circuit module is coupled to the second processing circuit and is used for providing an illumination light beam;

the display image generating module is coupled to the second processing circuit and is used for converting the illumination light beam into an image light beam; and the projection optical system is positioned on a transmission path of the image light beam and is used for projecting the image light beam to a projection target, wherein the display image generating module receives the dynamic image data and provides the image light beam corresponding to the dynamic projection data to the projection optical system, such that the projection optical system projects the dynamic projection image to the project target according to the dynamic projection data.

9. The projection device of claim 1, wherein the switchable mechanism is an automobile door plate and the projection device is arranged at a lower edge of the automobile door plate, such that the projection apparatus projects the dynamic projection image to a ground when the automobile door plate is in the open state.

10. A projection method, applied to a projection device, comprising:

enabling a projection apparatus and a video and audio processing circuit by a power control circuit according to a power signal when the power control circuit receives the power signal provided by an external power supply unit when a switchable mechanism is in an open state, wherein the video and audio processing circuit comprises a first control circuit and a second control circuit, and the first control circuit stores a set data;

controlling the projection apparatus by the second control circuit coupled to the first control circuit and the projection apparatus;

providing the set data from the first control circuit to the second control circuit;

setting the projection apparatus by the second control circuit according to the set data;

outputting the dynamic image data to the projection apparatus by the second control circuit, and;

controlling the projection apparatus to project the dynamic projection image according to the dynamic image data.

11. The projection method of claim 10, further comprising:

outputting a static image data to the projection apparatus by the video and audio processing circuit when projection of the dynamic projection image by the projection apparatus is completed and the switchable mechanism is still maintained in the open state, such that the projection apparatus continuously projects a static projection image for a first preset duration according to the static image data.

12. The projection method of claim 2, further comprising:
after projection of the static projection image by the projection apparatus is completed and the switchable mechanism is still maintained in the open state, judging whether a total projection duration exceeds a second preset duration by the video and audio processing circuit, when the total projection duration does not exceed the second preset duration, the projection apparatus projects the dynamic projection image and the static projection image again in sequence according to the dynamic image data and the static image data.

13. The projection method of claim 10, further comprising:
enabling an audio apparatus according to the power signal by the power control circuit; and
outputting an audio data to the audio apparatus by the video and audio processing circuit, such that the audio apparatus outputs an audio according to the audio data.

14. The projection method of claim 10, wherein the switchable mechanism is an automobile door plate and the projection device is arranged at a lower edge of the automobile door plate, such that the projection apparatus projects the dynamic projection image to a ground when the automobile door plate is in the open state.

15. A projection system, comprising a switchable mechanism, a sensor, a power supply unit and projection device, wherein
the sensor is used for judging whether the switchable mechanism is in an open state so as to output a sensing signal;
the power supply unit is coupled to the sensor and is used for providing a power signal according to the sensing signal; and
the projection device comprises a projection apparatus, a video and audio processing circuit and a power control circuit, wherein
the video and audio processing circuit is coupled to the projection apparatus; and
the power control circuit is coupled to the projection apparatus and the video and audio processing circuit, and is used for receiving the power signal,
wherein the power control circuit is configured to enable the projection apparatus and the video and audio processing circuit to operate according to the power signal, the video and audio processing circuit is configured to output a dynamic image data to the projection apparatus and to control the projection apparatus to project a dynamic projection image according to the dynamic image data, wherein the video and audio processing circuit comprises a first control circuit and a second control circuit, wherein
the first control circuit is used for storing a set data; and
the second control circuit is coupled to the first control circuit and the projection apparatus, and is used for controlling the projection apparatus,
wherein the first control circuit and the second control circuit are respectively configured that the first control circuit is used for providing the set data to the second control circuit, and the second control circuit sets the projection apparatus according to the set data and outputs the dynamic image data to the projection apparatus.

16. The projection system of claim 15, wherein when projection of the dynamic projection image by the projection apparatus is completed and the switchable mechanism is still maintained in the open state, the video and audio processing circuit outputs a static image data to the projection apparatus, such that the projection apparatus continuously projects a static projection image for a first preset duration according to the static image data.

17. The projection system of the claim 16, wherein when projection of the static projection image by the projection apparatus is completed and the switchable mechanism is still maintained in the open state, the video and audio processing circuit judges whether a total projection duration exceeds a second preset duration, when the total projection duration does not exceed the second preset duration, the projection apparatus projects the dynamic projection image and the static projection image again in sequence according to the dynamic image data and the static image data.

18. The projection system of claim 15, further comprising:
an audio apparatus, coupled to the power control circuit and the video and audio processing circuit,
wherein the power control circuit further enables the audio apparatus to operate according to the power signal, such that the video and audio processing circuit outputs an audio data to the audio apparatus and controls the audio apparatus to output an audio according to the audio data.

19. The projection system of claim 15, wherein the switchable mechanism is an automobile door plate and the projection device is arranged at a lower edge of the automobile door plate, such that the projection apparatus projects the dynamic projection image to a ground when the automobile door plate is in the open state.

20. A projection device, comprising a projection apparatus, a video and audio processing circuit, a power control circuit and a data connection module, wherein
the video and audio processing circuit is coupled to the projection apparatus; and
the power control circuit is coupled to the projection apparatus and the video and audio processing circuit, and is used for receiving a power signal correspondingly provided by an external power supply unit when a switchable mechanism is in an open state,
wherein the power control circuit enables the projection apparatus and the video and audio processing circuit according to the power signal, such that the video and audio processing circuit outputs a dynamic image data to the projection apparatus and controls the projection apparatus to project a dynamic projection image according to the dynamic image data, and
the data connection module is coupled to the video and audio processing circuit, the data connection module is adapted to connect to an outside data source in wire or wireless manner so as to receive at least one of updated dynamic image data, updated static image data or updated audio data, wherein the video and audio processing circuit comprises a first control circuit and a second control circuit, wherein
the first control circuit is used for storing a set data; and
the second control circuit is coupled to the first control circuit and the projection apparatus, and is used for controlling the projection apparatus,
wherein the first control circuit and the second control circuit are respectively configured that the first control circuit is used for providing the set data to the second control circuit, and the second control circuit sets the projection apparatus according to the set data and outputs the dynamic image data to the projection apparatus.

* * * * *